INVENTORS.
KOJI ITO, SADAO ARAI
and NOBUO TSUCHIYAMA

United States Patent Office 3,658,947
Patented Apr. 25, 1972

---

3,658,947
COMPOSITE RUBBER-MODIFIED
THERMOPLASTIC RESIN
Koji Ito, Hekikai-gun, Sadao Arai, Minami-ku, and Nobuo Tsuchiyama, Mizuho-ku, Japan, assignors to Toray Industries, Inc., Tokyo, Japan
Filed Dec. 16, 1968, Ser. No. 783,908
Claims priority, application Japan, Dec. 14, 1967, 42/79,765; Feb. 17, 1968, 43/9,605; Aug. 5, 1968, 43/55,022
Int. Cl. C08d 9/08
U.S. Cl. 260—887                                        10 Claims

ABSTRACT OF THE DISCLOSURE

A composite two phase rubber-modified thermoplastic resin is described in which a rubber component has been dispersed in a thermoplastic resin matrix in a finely divided form, wherein the rubber particles have the geometric shape of oblate spheroid in which the ratio of the length of the minor axis to that of the major axis is at most 0.5, which resin does not exhibit the stress whitening phenomenon. Also described is a method of preparing such a resin from a similar resin wherein the rubber particles are of spheroidal shape which involves rolling or stretching the same within the temperature range from room temperature to the softening temperature of the resin. Also disclosed is a method for improving the dimensional stability of the modified resin having rubber particles in the shape of an oblate spheroid by heat treating under tension or with permissive limited shrinkage at a temperature in the range of from at least 5° C. above the heat distortion temperature to a temperature below the softening temperature.

BACKGROUND OF THE INVENTION

(1) Field of the invention

Figure 1:
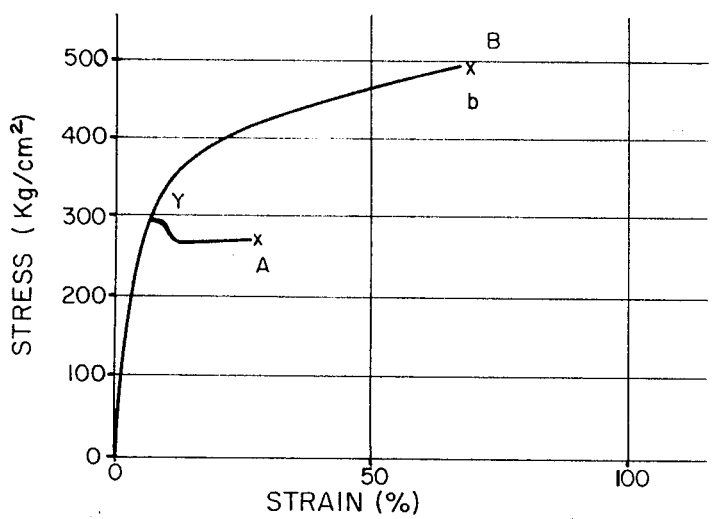

The present invention relates to improved rubber-modified thermoplastic resinous materials, and more particularly to a rubber-modified thermoplastic resin which is free from any stress whitening phenomenon, and methods of preparing and treating the same.

(2) Description of the prior art

In general, shaped articles of rubber-reinforced resins, such as high impact polystyrene resin, acrylonitrile-butadiene-styrene resin or high impact vinyl chloride resin, prepared by dispersing therein particles of a rubber having particle sizes within the range of from about 0.1 to about 20 microns are brittle materials called glassy resin which whiten in distorted areas created by imposing thereon a tensile load, flexural load or impact load in the region of distortion or which are strained near the limit of resiliency, namely, the yield point of the material. As a result, the market-value of these shaped articles is diminished, and in addition, such materials are significantly limited to secondary methods of processing or fabrication, such as sheet forming. This undesirable phenomenon is called "stress whitening." Recently, it has been proven that "stress whitening" is based on the nature of the resinous composition of such complex two phase systems as exemplified by the investigations by C. B. Bucknell and R. R. Smith, Polymer 6, 437 (1965), and S. Newman and S. Strella, J. Appl. Polymer Sci. 9, 2297 (1965). Special Morphological studies have been made, and as is well known in the art, this stress whitening phenomenon is considered to be unavoidable with respect to two phase resinous compositions because of the differential in the Refractive Index in an energy absorbing zone called "craze material" which is formed in the vicinity of the dispersed rubber particles. In certain applications of using these materials, for example, in a sheet forming process, such as cold deep-drawing or press punching, the whitening spoils the beauty of the shaped articles and causes deterioration in the physical and mechanical properties thereof in the whitened areas. The molecular orientation technique of stretching which has been widely adopted as a convenient manner for improving the physical and mechanical properties of shaped articles of certain thermoplastic resinous materials is known to be inapplicable to the rubber-glassy resin two-phase compositions, and in fact, has not been applied thereto.

SUMMARY OF THE INVENTION

We have discovered a rubber-modified thermoplastic resinous composition which does not whiten under high load-high stress conditions, and which possesses good cold sheet forming properties and improved physical and mechanical properties, and methods of preparing and treating such resinous compositions.

The two phase rubber-modified thermoplastic resin composition of this invention consists of a thermoplastic resin component having dispersed therein a finely divided rubber component in an amount within the range of from about 1% to about 40% by weight of the thermoplastic resin component, in which the particles of the rubber component are of the shape of an oblate spheroid (ellipsoid of rotation) in which the ratio of the length of the minor axis to that of the major axis is at the most 0.5, and the average length of the minor axis of the particles is within the range of from about 0.05 micron to about 10 microns and the average length of the major axis is within the range of from about 0.1 micron to about 60 microns.

The improved resinous composition of this invention may be obtained by the method of either rolling or stretching a conventional rubber-modified thermoplastic resin (in which the particles of rubber are in the shape of a true sphere) within the temperature range of from about room temperature to almost the softening temperature of the resin. As a result, the resinous matrix is molecularly oriented. This method is characterized not only in that the distortion or deformation of the rubber particles caused by the distortion of the resinous matrix has no adverse effect on the improvement brought about by the presence of such rubber particles, but is also characterized in that the enhancement in strength due to such orientation effectively enhances the strength of the total composition.

The rubber component in the rubber-modified thermoplastic resin of this invention used as a starting material may be any of those rubbery substances which exhibit rubbery elasticity or resiliency at relatively low temperatures such as for example, polybutadiene rubber, styrene-butadiene rubber (preferably where the styrene content is from 20 to 30% of the total rubber composition), butadiene-acrylonitrile rubber (preferably where the acrylonitrile is from about 25 to about 40% of the total rubber composition) isobutylene-isoprene rubber, that is (butyl rubber) (preferably where the isoprene content is from about 2 to about 3% of the rubber composition) and similar synthetic rubbers as well as natural rubber which are in finely divided form of average particle sizes within the range of from about 0.1 to about 10 microns, with each particle being substantially of true spherical shape.

The thermoplastic resin utilized as a starting material for the resin of this invention may be any of the thermally plasticizable substantially linear high molecular weight compounds such as the following:

(1) Polymers of at least one aromatic vinyl monomer represented by the formula,

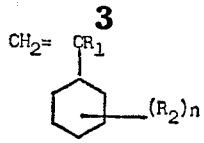

wherein $R_1$ is a hydrogen atom or alkyl group with 1–3 carbon atoms, $R_2$ is a hydrogen or halogen atom or alkyl group with 1–3 carbon atoms and $n$ is 1 or 2, exemplified by polystyrene, poly-α-methylstyrene, polyvinyltoluene, styrene-α-methylstyrene copolymers, polychlorostyrene;

(2) Polymers of at least one alkyl acrylate or methacrylate having the formula,

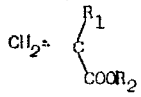

where $R_1$ is a hydrogen atom or alkyl group with 1–3 carbon atoms and $R_2$ is an alkyl group with 1–3 carbon atoms, for example polymethyl methacrylate, polyethyl methacrylate, polymethyl acrylate, polyethyl acrylate;

(3) Polymers having at least one vinyl or vinylidene halide of the formula,

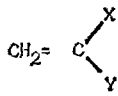

where X is a halogen atom and Y is a hydrogen or halogen atom, for example polyvinyl chloride, polyvinylidene chloride;

(4) Copolymers of a monomer (1) and a monomer (2), for example styrene-methyl methacrylate copolymers, styrene-methyl acrylate copolymers;

(5) Copolymers of at least one monomer of (1) or (2) with a vinyl cyanide monomer of the formula,

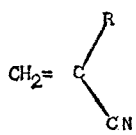

where R is a hydrogen atom or methyl group of a content of (1) or (2) of 65–80% by weight, exemplified by styrene-acrylonitrile copolymers, styrene-acrylonitrile-methyl methacrylate copolymers, methyl acrylate-acrylonitrile copolymers, methyl methacrylate-acrylonitrile copolymers.

The two phases complex of the thermoplastic resin and rubber of this invention may be prepared in any of the known compounding ways, namely, those in which rubber and resins are blended directly, as well as methods in which rubber and resins are blended in the forms of latices, and also methods in which either one of the rubber or resin is graft polymerized on the other, and also methods of graft blending the resin and rubber. The blending ratio of the rubber to the thermoplastic resin may be appropriately selected depending upon the use to which the resulting blend is to be put, though generally from 1 to 40, and preferably from 10 to 30 parts of the rubber is incorporated in 100 parts of the resin.

It is a significant factor in minimizing the stress whitening phenomenon of plastic materials reinforced by rubber particles to insure that the spherical rubber particles are substantially converted to oblate spheroidal particles. It has been proven that no sufficient effect is obtained by the mere orientation of the resinous matrix to an extent that causes a small distortion of particles of the rubber. As hereinbefore described, particles of the rubber dispersed in the resinous matrix are in general in the shape whereby the length of the minor axis to that of the major axis is approximately 1, that is spherical. It is therefore necessary to convert such particles into a flattened shape resembling an oblate spheroid, or ellipsoid of rotation, wherein the ration of the length of the minor axis to that of the major axis is at most 0.5 and preferably 0.3 or even less. The smaller this ratio, the greater the effect of minimizing the stress whitening phenomenon. While there are no theoretical lower limits to this ratio, the practically attainable smallest value is 0.1. The shape of the particles of rubber may be observed by means of an electronic microscope, which is best supplemented by dyeing the rubber particles and setting the same with osmic acid followed by slicing ultra-thin fragments therefrom.

The desired orientation of the resinous matrix and accompanying distortion of the rubber particles as herein described may be most conveniently attained by compressively extending a sheet of rubber-reinforced thermoplastic material in the conventional procedure known as rolling. This may be performed, for example, by passing the sheet between a pair of driven rollers the gap between the rollers being adjusted to at most about 95% of the thickness of the sheet to be rolled, thereby imposing a compressive load to the sheet while enabling the sheet to be withdrawn so as to impose a high shearing force thereon. Suitable results are obtained when the processing temperature of the sheet material ranges from about room temperature (20° C.) to about the temperature at which the material becomes fluid, which varies from resin to resin, but is usually not higher than about 150° C. Generally similar results are obtained within this temperature range. The preferred temperature range is from about 50° C. to about 130° C.

The compression of the material is represented by the roll reduction designated by the following equation, $$\text{Roll reduction in thickness } \frac{\Delta h}{h} = \frac{t_1 - t_2}{t_1}$$

where $t_1$ and $t_2$ are the thicknesses of the material before and after the treatment, respectively.

As mentioned above, it is necessary in order to obtain sufficient prevention of "stress whitening" in a rubber-thermoplastic two-phase mixture to give a distortion sufficient to make the elliptic ratio of rubber particles $R_2/R_1$, 0.5 or less with orientation of the resinous matrix. For this, the roller reduction ($\Delta h/h$), must be 0.2 or more. Although there is no upper limit in the value of $\Delta h/h$ in practice the value is at most 0.65. If it exceeds 0.65, there occur, on occasion, cracks in the sheet material. The preferred roll reduction is from 0.3 to 0.6.

The distortion of rubber particles may also be attained by mono- or biaxially stretching the sheet without imposing any external compressive force thereto at a temperature within the range from room temperature (about 20.° C.) to the temperature at which the sheet material becomes fluid preferably at from 90–130° C. The draw ratio sufficient to give a distortion of rubber particles to an elliptic ratio of at most 0.5 is at least 1.5 and usually at most 7.0. A draw ratio of less than 1.5 is too small to give a sufficient distortion to rubber particles for attaining the object of the process of this invention. Moreover, a draw ratio of more than 7.0 is impracticable because it is difficult to carry out continuous stretching operation with stability at such high draw ratios. The preferred draw ratio ranges from about 2.0 to about 4.0. The draw ratio means for the purpose of the method of this invention the ratio of the area of the stretched sheet to that of the unstretched sheet.

The objects of the present invention are not attainable even when the elliptic ratio of rubber particles is made 0.5 or less if, at the same time, the particle sizes of rubber particles are too large or two small. The average length of the minor axis of the rubber particles in ellipsoidal shape may be in the range of from about 0.05 micron to about 10 microns, preferably 0.1–3 microns, and the average length of the major axis may be 0.1–60, and preferably 0.5–30 microns. In cases where the average length is greater than the above limits it is difficult to expect the effect of rubber-reinforcement, namely, enhancement in impact strength. In cases where the average length is smaller than the above limits, there are obtained similarly unsatisfactory results.

Comparing the degree or extent of improvement in properties of rubber-reinforced plastic material in which particles of the rubber have been flattened to elliptic ratios $R_2/R_1$ of 0.5 or less with orientation of the resinous matrix, as in the present study, by means of stress-strain curves at room temperature which have generally been employed for evaluation of plastic material, there is observable an effect in general as indicated by FIG. 1. In the stress-strain curve on an ordinary rubber-reinforced plastic material, there is a distinct yield point corresponding to strains of 3–7%, as indicated by the curve A in FIG. 1, and the plastic material yields stress whitening in the vicinity of the yield point, the degree of the whitening increasing with increase of strain. On the contrary, the curve B, of a plastic material which has been subjected to compression treatment to flatten particles of the rubber to ellipsoidal shape with orientation of the plastic matrix, does not indicate any distinct yield point, while the stress whitening phenomenon as observable on the material (A) fades out. The degree of diminution of the stress whitening has close relation with the degree of compression or stretching, and therefore with increasing orientation of the resinous matrix and the elliptic ratio of particles of the rubber component, the stress whitening phenomenon becomes quite unobservable. It should be noticed in FIG. 1 that the tensile strength of the material (B) is a little over 2 times that of the material (A) and the elongation at break of the former is far greater than that of the latter, that is to say, the treatment in accordance with this study not only minimizes stress whitening but also improves the toughness and stiffness of material.

These improvements in the properties of rubber modified resinous material greatly enlarge their fields of application. For instance, in the vacuum forming process or plug forming process which has been employed as a fabrication process for ordinary sheet material such as material (A), it is necessary to preheat the material to its softening or melting point, whereby the fabrication of the material is restricted in the forming cycle and handling. This preheat causes at least partially the high cost of such a commodity.

On the other hand, when using the sheet material (B), prepared by the method of this invention, it is possible to obtain shaped articles with good external appearance and excellent mechanical properties at high production rate and low cost since the sheet material can be fabricated in a deep drawing process or pressing process. These methods are known to be cold plastic fabrication processes usually adopted in fabrication of metallic materials, and the sheet material of this invention is deformable at room temperature to a great extent without accompanying any stress whitening. However, the rubber-modified resinous sheet material prepared in the hereinbefore described method has a short-coming for some applications namely, poor dimensional stability at elevated temperatures. It seems that this property is caused by the fact that the distortion of rubber particles to ellipsoidal shape has been bestowed by shearing forces present during orientation of the resinous matrix so that in general there occurs shrinkage of the sheet accompanied by relaxation of the orientation at temperatures above the softening temperature or second order transition temperature of the sheet material. Especially since said material is formed by compulsory deformation of the rubber particles, the influence of relaxation and the tendency toward restoration to the original state of the rubber particles is prominent and, this therefore plays the role of a siginficant factor in lowering the dimensional stability at elevated temperatures. In particular, when exposed to an environment near the heat distortion temperature of the material in a relaxed state, the material restores its original dimensions before orientation by rolling or stretching, then loses the advantageous various properties as mentioned above. Oriented films, sheets and like shaped structures of rubber-modified resinous material which has been improved in physical properties by the incorporation of rubber exhibits an especially great restoring force at elevated temperatures and, thence, has a very poor dimensional stability at elevated temperatures, so that they are restricted in the fields of application.

We have therefore also discovered that the tough rubber-thermoplastic resin composite material which has a reduced tendency to stress whitening and a good secondary fabricating property, i.e., cold deep drawing property, may be further improved in dimensional stability at elevated temperature and in deep drawability without any adverse effect on its desirable properties by subjecting it to either one of the following treatments:

(A) A heat treatment of the rubber-thermoplastic resin composite material in which rubber particles have been deformed into ellipsoidal shape by rolling or stretching in accordance with the method of this invention at a temperature at least 5° C. above the heat distortion temperature of the material and below the softening temperature of the material under tension or while fixing the periphery of the material, and (B) A heat treatment of the rubber-thermoplastic resin composite material in which rubber particles have been deformed into ellipsoidal shape by rolling or stretching in accordance with the method of this invention at a temperature at least 5° C. above the heat distortion temperature and below the softening temperature of the material under relaxed condition, while allowing the material to shrink by at most 15%.

The heat distortion temperature as defined herein, means a temperature as determined in accordance with ASTM 648/58, and the softening temperature means a temperature as determined in accordance with ASTM D 569–48.

The reason for setting the treating temperature on the above treatments (A) or (B) within the range from the temperature at least 5° C. above the heat distortion temperature of the material to the softening temperature of the material is that the temperatures below the lower limit as designated above are undesirable because at such low temperature there is obtainable little effect, and the temperatures above the upper limit as designated above are also undesirable because at such high temperatures the molecular orientation is completely disordered, while the improved properties are deteriorated and the treatment causes an unevenness in thickness.

The requisite heat treating time is determined definitely by the nature of material, the drawing ratio, the treating temperature and like factors, though there is no special limitation. The heat-treatment time is 0.3–5 minutes.

The shrinkage upon the heat treatment in a relaxed state should be restricted within at most 15% because shrinkage more than 15% causes too great deterioration in mechanical properties and unevenness in thickness. The shrinkage, here, is the percentage of the decrement of the length of the material to the initial length of the stretched or rolled material. The minimum ratio of the shrinkage is not definite, and the case of zero shrinkage corresponds to the heat treatment under tension (A) as mentioned above. The shrinkage of the material may be regulated in any suitable manner. For instance, the shrinkage may be given by adjusting the ratio of the revolution of feed roller and of a withdrawal roller in the heat treating step subsequent to the stretching or rolling step. Alternately, in batchwise process, it is attained by setting the material in a frame making allowance for shrinkage. These methods are not restricted to use of special apparatus. This treatment is also applicable to rubber-thermoplastic resin composite material loaded with any additive.

According to the method of this invention, as fully explained above, there is obtainable a sheet material which has an excellent dimensional stability at elevated temperature, a minimized tendency to stress whitening under a high load strain and retains the desirable properties of oriented rubber-modified thermoplastic resinous material.

DESCRIPTION OF THE PREFERRED EMBODIMENTS

Example 1

The material used in this experiment is an ABS (acrylonitrile, butadiene, styrene) resin prepared by blending 100 parts by weight of a styrene 75/acrylonitrile 25 copolymer resin and 16 parts by weight of a polybutadiene (PBD) in which the rubber particles are in the shape of perfect sphere of an average particle size of 0.25 micron. The softening temperature of the resin is 170° C. From the resin, a sheet of 3 mm. thickness is formed by a conventional melt extrusion process and rolled to form specimens for investigations between the reduction in thickness of the sheet by compression (namely, roll reduction) $\Delta h/h$, the elliptic ratio of the rubber particles and the effects of the treatment. The results of the investigations on the relations therebetween are summarized in Table 1. The rolling is carried out at a temperature of 30° C.

The values of birefringence listed in the above table are determined by means of a polarization microscope fitted with a Berek Compensator using as a light source a sodium lamp of a wave length of 589 milli-microns. The degree of stress whitening in load distorted surface of specimens is evaluated by naked eye observation and indicated by stepwise valuation: X whitened to a great extent, $\triangle$ somewhat whitened, $\bigcirc$ not whitened, and $\odot$ not whitened rather becomes more lucid.

The influences of the elliptic ratios of the rubber particles at the same degree of orientation are summarized in Table 2.

The influence of the preheat temperatures of the sheet material are investigated at temperatures ranging from room temperature to the softening temperature of the material, and the results obtained are shown in Table 3.

As proven by these experimental results, a tough rubber-reinforced rubber-thermoplastic resin two-phase composite material having a minimized tendency to stress whitening and excellent mechanical properties is obtainable by converting the shape of spherical rubber particles to ellipsoidal (oblate spheroidal) shape having elliptic ratios of 0.5 or less at temperatures within the range of from about room temperature to about the softening temperature of the material while orienting the resinous matrix.

Example 2

Figure 2:
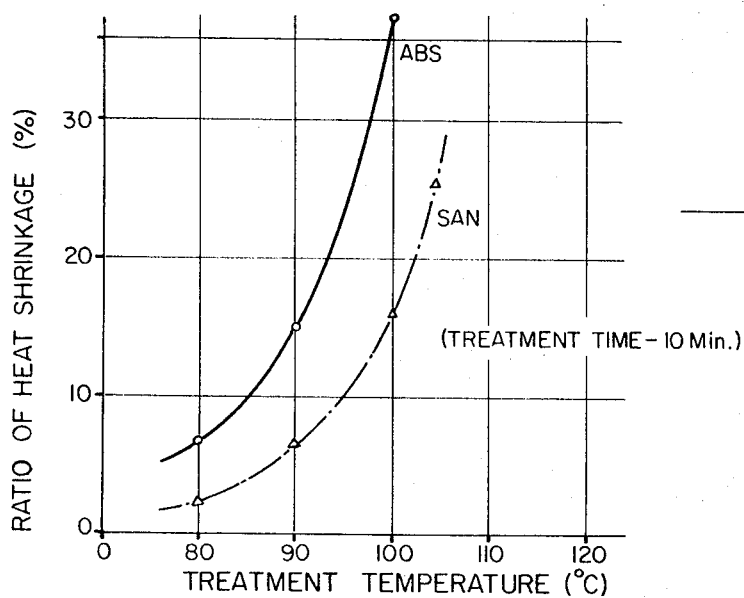
Figure 3:
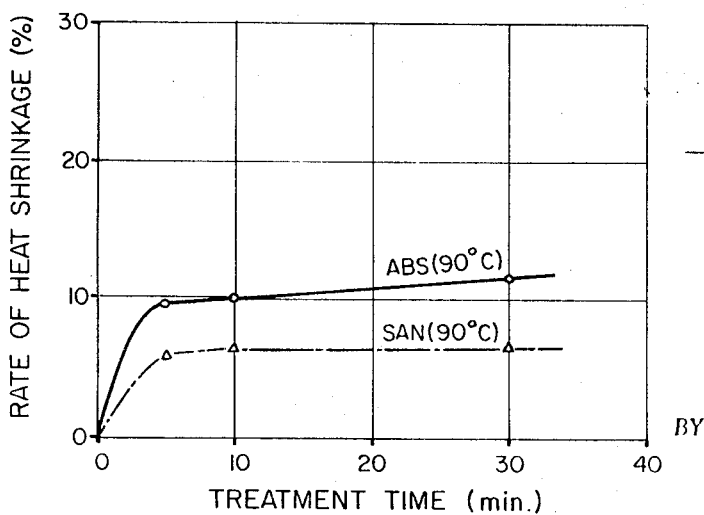

An ABS resin heat (distortion temperature, 87° C.; softening temperature, 170° C.) obtained by emulsion polymerization of 17.5 parts by weight of acrylonitrile and 52.5 parts by weight of styrene in the presence of 30 parts by weight of a polybutadiene in the form of latex having an average particle size of 0.25 micron is rolled between a pair of contiguous driven rollers at 80° C. In this case, the reduction in thickness of the sheet $\Delta h$ is 0.31–0.32, the elliptic ratio after rolling of the rubber particles $R_2/R_1$ is 0.4–0.5, and the average length of the major axis of the rubber particles is 0.50 micron and the average length of the minor axis is 0.20 micron. The shrinkage of the ABS resin at elevated temperature is indicated in FIGS. 2 and 3. The shrinkage at elevated temperatures of a styrene-acrylonitrile resin of a styrene content of 75%, corresponding to the resinous matrix of the above ABS resin, after rolling in the similar manner to the reduction in thickness $\Delta h = 0.31$–$0.32$ is also indicated in FIGS. 2 and 3 in comparison to that of the ABS resin.

The shrinkage at elevated temperatures (heat shrinkage) means the rate of the change in the length in the machine direction of the sheet when the sheet is placed in an environment of a determined temperature for a determined time under relaxed condition.

The rolled sheet material exhibits, as indicated by FIG. 2, an abrupt increase in the heat shrinkage in the proximity of about 90° C., which is said to be the heat distortion temperature of ABS resin, and lacks dimensional stability. It is obvious that the restoring force of the rubber particles has a great influence on the dimensional stability at elevated temperatures from the fact that the composite material has a very poor dimensional stability at elevated temperatures compared with a styrene-acrylonitrile resin corresponding to the resinous matrix of the composite material.

As indicated by FIG. 3, the relaxation seems to proceed within a relatively short period of time. Accordingly, although the rubber-thermoplastic resin two-phase composite material is improved in stress whitening property and other various properties by the rolling, the rolled material has a shortcoming that is can be put to practical use only at room temperature.

Then, the rolled ABS resin sheet is heat treated while setting the periphery of the sheet by means of a stenter.

In Table 4, there is indicated a relationship between the heat treating conditions under tension and the heat shrinkage (dimensional stability at elevated temperatures) of the rolled ABS resin sheet.

The heat shrinkage at 90° C., in the direction of length, width and thickness, of a sheet which has been heat treated at 110–120° C. under tension is about $\frac{1}{10}$ times that of an untreated sheet; thus indicating that the dimensional stability is improved to a great exent by the heat treatment. The tensile strength is decreased by about 10%, but the heat treated material has no tendency to stress whitening. Considering that an unrolled ABS resin has a tensile strength of 300–350 kg./cm.$^2$ and a tendency to stress whitening, the heat treatment can be appreciated to be an effective means for improving the dimensional stability without any adverse effect on improvements in the mechanical properties of a cross laminate of an extruded sheet of a glass-reinforced ABS resin.

For examining the deep drawing property at room temperature, Erichsen test is made according to JIS B7729, and the depth of drawing (Erichsen value), the resilient recovery (Spring back) and the degree of stress whitening are compared with respect to a specimen which has been heat treated under tension in the manner as mentioned above and another specimen which has not been heat treated. The results are shown in Table 5.

As indicated by Table 5, between the treated and untreated material, there is no appreciable difference in Erichsen value and external appearance, but the dimension retention on press molding is improved to a great extent by the heat treatment under tension (as indicated by comparison of the values of spring back). This effect is exhibited more distinctly when the shape of configuration of the molding is more complex, and enhance the press-forming property.

Example 3

A butadiene-styrene-acrylonitrile thermoplastic resin of a butadiene content 30% by weight, a styrene content 52.5% by weight and an acrylonitrile content 17.5% by weight (heat distortion temperature 87° C., softening temperature 170° C.) is extruded into a 3.0 mm. thick sheet. The sheet is biaxially orientated by rolling at 60° C. in the manner such that the sheet is expanded in longitudinal direction by 2.0 times its original length and in lateral direction by 1.5 times its original width to form a sheet of 1 mm. thickness. The orientated ABS resin sheet of a length ($\Delta L + L$) is set in a frame of a length L and exposed to a hot air stream at 130° C. while allowing to shrink by $\Delta L$. In Table 6 there are summarized the relationship between the percentage of shrinkage and the mechanical and physical properties of the resulting sheet, the heat shrinkage of the resulting sheet at 90° C. in hot air for 10 mins. and the mechanical and physical properties of the sheet after heat shrinkage. In the case of the relaxation of more than 15%, the mechanical and physical properties are deteriorated to too great an extent to attain the object of this invention, and local irregular shrinkage results in a sheet of uneven thickness.

Example 4

A rolled and orientated ABS resin sheet, as in Example 3, is subjected to heat treatment at various temperatures under a relaxed condition as to allow shrinkage of 5.0%. On the so treated sheets, mechanical and physical properties are determined before and after a heat treatment at 90° C. for 10 minutes. The results obtained are summarized in Table 7.

of 0.2 micron and 0.5-3.5 parts of organo-tin stabilizer, and the resulting mixture is extruded into a 2.0 mm. thick sheet.

The sheet is rolled at a roll temperature of 40° C. and the relationship between the reduction in thickness of the sheet by compression ($\Delta h/h$) and the elliptic ratio of the rubber particles and the effect of the treatment. The results obtained are summarized in Table 9. The methods of determination of various properties and the standard of evaluation is according to those in Example 1.

TABLE 1

| Compression (roll reduction $\Delta h/h$) | Birefringence ($\Delta n$) | Average elliptic ratio of rubber particles ($R_2/R_1$) | Degree of stress whitening | Average rubber particle sizes (microns) | | Tensile properties | | | |
|---|---|---|---|---|---|---|---|---|---|
| | | | | Major axis | Minor axis | Stress at yield ($\sigma y$) (kg./cm.²) | Strain at yield ($\xi y$) (percent) | Stress at break ($\sigma b$) (kg./cm.²) | Stress at break ($\xi b$) (percent) |
| 0 | 0×10⁻³ | 1 | X | 0.25 | 0.25 | 370 | 2.8 | 320 | 25 |
| 0.1 | 0.028×10⁻³ | 0.8 | X | 0.30 | 0.24 | 384 | 3.8 | 355 | 28 |
| 0.2 | 0.238×10⁻³ | 0.5 | △ | 0.40 | 0.20 | 436 | 5.2 | 504 | 67 |
| 0.3 | 1.149×10⁻³ | 0.33 | ○ | 0.55 | 0.18 | | | 578 | 61 |
| 0.5 | 3.810×10⁻³ | 0.25 | ◎ | 0.68 | 0.16 | | | 654 | 30 |
| 0.6 | 4.830×10⁻³ | 0.18 | ◎ | 0.82 | 0.14 | | | 763 | 25 |

TABLE 2

| Degree of orientation (birefringence $\Delta n \times 10^{-3}$) | Average elliptic ratios of rubber particles ($R_2/R_1$) | Stress whitening | Average particle sizes of rubber particles ($\mu$) | | Tensile properties | | | |
|---|---|---|---|---|---|---|---|---|
| | | | Major axis | Minor axis | Kg./cm.², $\sigma y$ | Percent, $\xi y$ | Kg./cm.², $\sigma b$ | Percent, $\xi b$ |
| 1.15 | 0.75 | X | 0.28 | 0.22 | 420 | 5.2 | 570 | 61 |
| 1.15 | 0.52 | △-○ | 0.40 | 0.21 | | | 578 | 60 |
| 1.15 | 0.33 | ○ | 0.55 | 0.18 | | | 582 | 61 |

Example 5

An ABS resin sheet, as in Example 3, is rolled at 60° C. and heat treated at 130° C. under a relaxed condition as to allow to shrink by 10%. On the sheet thus obtained, the relationship between the draw ratio and the mechanical properties is surveyed. The results obtained are summarized in Table 8.

Whitening is not observed at all on the shaped structures prepared by deep drawing of sheet materials in which the elliptic ratio of the rubber particles is at most 0.5 after heat treatment under a relaxed condition.

TABLE 3
[Influences of treating temperature ($\Delta h/h=0.35$, $R_2/R_1=0.30$)]

| Preheat temperature of sheet material (° C.) | Stress whitening | Tensile properties | | | |
|---|---|---|---|---|---|
| | | Kg./cm.², $\sigma y$ | Percent, $\xi y$ | Kg./cm.², $\sigma b$ | Percent, $\xi b$ |
| 25-30 | ○ | | | 554 | 44 |
| 60-65 | ○ | | | 513 | 30 |
| 90-100 | ○ | | | 505 | 41 |

TABLE 4.—HEAT SHRINKING PROPERTY OF A ROLLED RUBBER-GLASSY RESIN TWO-PHASE COMPOSITE RESINOUS MATERIAL WHICH HAS BEEN HEAT TREATED WHILE SETTING ITS PERIPHERY BY FRAMES

| Heat treating conditions, temperature (° C.)/time (mins.) | Heat shrinkage (percent) at 87-90 ° C. for 10 minutes | | | Heat shrinkage (percent) at 98-100° C. for 10 minutes | | | Tensile properties | |
|---|---|---|---|---|---|---|---|---|
| | Length (−) | Width (−) | Thickness (+) | Length (−) | Width (−) | Thickness (+) | Tensile strength (kg./cm.²) | Elongation at break (percent) |
| Untreated | 11.6-11.6 | 12.9-13.7 | 29-32.1 | 33.0 | 29.4 | 131 | 536-565 | 41.5-46.5 |
| 97-100/5 | 5.0-5.0 | 3.9-6.2 | 11.0-14.5 | 26.0 | 25.0 | 91.5 | 506-523 | 47-48 |
| 103-105/5 | 5.0-5.0 | 51.-6.5 | 11.6-14.0 | 20.0 | 19.7 | 68.7 | 502-504 | 39-41.5 |
| 105-107/10 | 2.0-2.0 | 1.1-1.7 | 3.8-5.0 | 20.0 | 18.2 | 65.3 | 520-523 | 45.5-47.0 |
| 110-113/5 | 1.6-2.0 | 1.0-1.3 | 2.3-3.0 | 18.0 | 16.2 | 56.6 | 470-498 | 47-50.5 |
| 120-122/5 | 1.6-2.0 | 0.4-0.9 | 1.5-2.3 | 10.0 | 6.8 | 19.7 | 423-474 | 36-43 |

EXAMPLE 6

100 parts of a commercially available polyvinyl chloride resin is incorporated with 10 parts of an ABS resin for blending with vinyl chloride resin containing butadiene-styrene rubber particles of an average particle size

TABLE 5

| | Erichsen value E (mm.) | Spring back (percent) at E=13 | Appearance of the cup (degree of whitening) |
|---|---|---|---|
| Untreated | 11.9-17.8 | 23-25 | Whitening unobserved. |
| Treated at 120° C., 1 min. | 12.2-16.8 | 13-18 | Do. |

TABLE 6

| | Heat treatment at 130° C. under relaxed condition | | | | | | | | On and after heat treatment at 90° C. for 10 minutes | | | |
|---|---|---|---|---|---|---|---|---|---|---|---|---|
| Relaxation, percent | Tensile strength, kg./cm.² | Elongation at break, percent | Birefringence | Evenness of sheet | Average elliptic ratio $R_2/R_1$ of rubber particles | Average lengths of rubber particles ($\mu$) | | Stress whitening | Shrinkage percent | Tensile strength, kg./cm.² | Elongation at break, percent | Birefringence |
| | | | | | | Major axis | Minor axis | | | | | |
| 0.5 | 470-490 | 50-56 | 2.2×10⁻³ | Good | 0.26 | 0.18 | 0.68 | ◎ | 4.5 | 468-482 | 48-55 | 2.0×10⁻³ |
| 1.0 | 470-480 | 47-50 | 2.0×10⁻³ | do | 0.29 | 0.19 | 0.66 | ○ | 4.0 | 465-478 | 45-48 | 1.9×10⁻³ |
| 10.0 | 455-470 | 42-45 | 1.8×10⁻³ | do | 0.35 | 0.21 | 0.60 | ○ | 3.0 | 452-465 | 40-42 | 1.7×10⁻³ |
| 15.0 | 420-440 | 37-40 | 1.2×10⁻³ | Fair to poor | 0.44 | 0.22 | 0.50 | △ | 1.2 | 415-438 | 36-39 | 1.1×10⁻³ |
| 18.0 | 320-340 | 28-32 | 0.5×10⁻³ | Poor | 0.65 | 0.24 | 0.37 | X | 0.9 | 318-338 | 27-31 | 0.5×10⁻³ |

TABLE 7

Heat treatment under a relaxed condition, relaxation of 5.0%

| Temperature (° C.) | Tensile strength, kg./cm.² | Elongation at break, percent | Birefringence | Average elliptic ratio $R_2/R_1$ of rubber particles | Average length (μ) of rubber particles | | Stress whitening | Heat treatment at 90° C. for 10 minutes | | | |
|---|---|---|---|---|---|---|---|---|---|---|---|
| | | | | | Major axis | Minor axis | | Shrinkage, percent | Tensile strength kg./cm.² | Elongation at break, percent | Birefringence |
| 90 | 490–500 | 47–55 | 2.4×10⁻³ | 0.25 | 0.17 | 0.69 | ⊚ | 10.2 | 490–495 | 50–55 | 2.2×10⁻³ |
| 100 | 480–485 | 45–50 | 2.2×10⁻³ | 0.26 | 0.18 | 0.68 | ○ | 5.5 | 460–480 | 45–48 | 2.1×10⁻³ |
| 130 | 460–470 | 42–46 | 2.0×10⁻³ | 0.31 | 0.20 | 0.62 | ○ | 3.5 | 450–466 | 40–46 | 2.0×10⁻³ |
| 150 | 410–415 | 38–44 | 1.6×10⁻³ | 0.45 | 0.23 | 0.51 | △ | 3.0 | 410–415 | 35–39 | 1.5×10⁻³ |
| 180 | 320–330 | 30–35 | 0.4×10⁻³ | 0.70 | 0.24 | 0.34 | X | 1.2 | 310–320 | 30–33 | 0.2×10⁻³ |

TABLE 8

| Draw ratio | | Average elliptic ratio of rubber particles $(R_1/R_2)$ | Average size of rubber particles | | Stress whitening | Tensile strength (kg./cm.²) | Elongation at break (percent) | Birefringence |
|---|---|---|---|---|---|---|---|---|
| Longitudinal | Lateral | | Major axis | Minor axis | | | | |
| 0 | 0 | 1 | 0.25 | 0.25 | X | 280–300 | 25–30 | 0 |
| 1.2 | 1.3 | 0.51 | 0.23 | 0.46 | △ | 360–420 | 38–40 | 1.3×10⁻³ |
| 1.5 | 2.0 | 0.31 | 0.18 | 0.58 | ○ | 440–450 | 42–45 | 1.8×10⁻³ |
| 3.0 | 1.3 | 0.28 | 0.18 | 0.64 | ○ | 450–465 | 42–46 | 2.0×10⁻³ |

TABLE 9.—COMPRESSIVE DEFORMATION OF PVC/ABS SYSTEM AND THE EFFECTS

| Compressive deformation (Δh/h) | Birefringence, Δñ | Average elliptic ratio of rubber particles $(R_2/R_1)$ | Average sizes of rubber particles | | Stress whitening | Stress at yield (kg./cm.²) | Elongation at yield (percent) | Tensile strength (kg./cm.²) | Elongation at break (percent) |
|---|---|---|---|---|---|---|---|---|---|
| | | | Major axis | Minor axis | | | | | |
| 0 | 0 | 1 | 0.20 | 0.20 | X | 580 | 5.0 | 600 | 98 |
| 0.20 | 0.5×10⁻³ | 0.53 | 0.34 | 0.18 | △–X | 590 | 5.0 | 650 | 90 |
| 0.30 | 1.5×10⁻³ | 0.3 | 0.43 | 0.13 | ○ | 600 | 5.3 | 766 | 86 |
| 0.52 | 4.4×10⁻³ | 0.21 | 0.43 | 0.09 | ○ | 665 | 5.0 | 1,042 | 47 |
| 0.61 | 6.2×10⁻³ | 0.15 | 0.47 | 0.07 | ⊚ | 700 | 4.8 | 1,189 | 34 |

Having thus described our invention, we claim:

1. A two phase composite resin sheet material comprised of:

(A) about 99–60 percent by weight of a thermoplastic resin selected from the group consisting of:

(1) a polymer obtained by the polymerization of one or more monomers selected from a group consisting of:

(a) 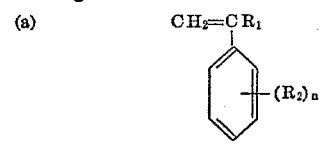

and (b) 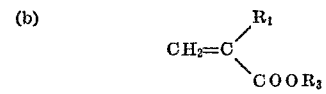

wherein $R_1$ is hydrogen or an alkyl having 1–3 carbon atoms, $R_2$ is hydrogen, halogen, or an alkyl having 1–3 carbon atoms, $R_3$ is an alkyl having 1–3 carbon atoms and $n$ is 1 or 2

(2) a copolymer obtained by the polymerization of 20–35 percent by weight of a member selected from the group consisting of acrylonitrile, methacrylonitrile with 80–65 percent by weight of one or more monomers selected from the group consisting of said (a) and (b)

(3) polyvinyl chloride and (4) polyvinylidene chloride (B) and about 1–40 percent by weight of a rubbery material selected from the group consisting of polybutadiene, styrene-butadiene, butadiene-acrylonitrile and isobutyleneisoprene said thermoplastic resin being formed into a matrix with said rubbery material being distributed throughout said matrix in oblate spheroids, each having a major axis and a minor axis; the ratio of the length of the minor axis to the major axis being at most 0.5; the average length of the minor axis being within the range of 0.05–10 microns; the average length of the major axis being within the range of 0.1 micron to about 60 microns whereby said sheet material is obtained having improved resistance to stress whiting.

2. The composite resin of claim 1 wherein the rubber component is polybutadiene rubber.

3. The composite resin of claim 1 wherein the thermoplastic resin component is a styrene-acrylonitrile copolymer.

4. The composite resin of claim 1 wherein the thermoplastic resin consists of an amount of acrylonitrile within the range of from about 20 percent to about 35 percent by weight, and an amount of styrene within the range of from about 80 percent to about 65 percent, and an amount of polybutadiene in the range of about 5 percent to about 40 percent as the rubbery material.

5. A method of manufacturing the two phase (rubber-modified) composite resin sheet material according to claim 1 comprising the steps of rolling between pressure rolls a two phase composite resin comprised of said thermoplastic resin having dispersed therein an amount within the range of from about one percent to about 40 percent by weight of spherical particles of said rubbery material having an average particle size within the range of from about 0.1 micron to about 10 microns, at a temperature within the range of from about room temperature to about the fluid temperature of the resin until a reduction in thickness of the resinous mass within the range of from about 20 percent of the original thickness to about 65 percent of the original thickness is achieved, thereby changing the form of the rubber particles from spherical to that of an oblate spheroid wherein the ratio of the length of the minor axis of the spheroid to that of the major axis is less than about 0.5, the average length of the minor axis is within the range of from about 0.05 micron to about 10 microns and the length of the major axis is within the range of from about 0.1 micron to about 60 microns.

6. A method of manufacturing the two phase composite resin sheet material according to claim 1 comprising the steps of monoaxially or biaxially stretching a two phase composite resin comprised of said thermoplastic resin having dispersed therein an amount within the range of from about one percent to about 40 percent by weight of spherical particles of said rubbery material having an average particle size within the range of from about 0.1 micron to about 10 microns, at a temperature within the range of from about room temperature to about the fluid temperature of the resin at a draw ratio within the range of from about 1.5 to about 7.0, thereby changing the form of the rubber particles from spherical to that of an oblate spheroid wherein the ratio of the length of the minor axis of the spheroid to that of the major axis is less than about 0.5, the average length of the minor axis is within the range of from about 0.05 micron to about 10 microns and the length of the major axis is within the range of from about 0.1 micron to about 60 microns.

7. A method of improving the high temperature dimensional stability of the two phase composite resin sheet material according to claim 1 comprising the step of heating the two phase thermoplastic composite resin sheet material at a temperature within the range of from at least about 5° C. above the heat distortion temperature of the resin to a temperature less than the softening temperature of the resin under tension.

8. A method of improving the high temperature dimensional stability of the two phase composite resin sheet material according to claim 1 comprising the step of heating the two phase thermoplastic composite resin sheet material at a temperature within the range of from at least about 5° C. above the heat distortion temperature of the resin to a temperature less than the softening temperature of the resin under a relaxed condition such as to allow the resin to shrink to an amount not more than about 15 percent.

9. The method according to claim 5 wherein said temperature is from 50–130° C.

10. The method according to claim 6 wherein said temperature is from 50–130° C.

References Cited

UNITED STATES PATENTS

| | | | |
|---|---|---|---|
| 3,505,274 | 4/1970 | Kolberg | 260—34.2 |
| 3,103,498 | 9/1963 | Scriba et al. | 260—45.5 |
| 3,026,223 | 3/1962 | Vanderbilt et al. | 154—43 |
| 3,012,282 | 12/1961 | Donald | 18—47.5 |
| 2,614,094 | 10/1952 | Wheelock | 260—891 |
| 3,168,593 | 2/1965 | Fremon et al. | 260—880 |

FOREIGN PATENTS

| | | | |
|---|---|---|---|
| 1,269,360 | 5/1968 | Germany | 260—893 |

SAMUEL H. BLECH, Primary Examiner

J. SEIBERT, Assistant Examiner

U.S. Cl. X.R.

260—4, 888, 890, 891, 892, 893; 264—210